(12) United States Patent
Nonaka

(10) Patent No.: US 10,075,613 B2
(45) Date of Patent: Sep. 11, 2018

(54) INFORMATION PROCESSING APPARATUS, NON-TRANSITORY COMPUTER READABLE MEDIUM, AND INFORMATION PROCESSING METHOD

(71) Applicant: FUJI XEROX CO., LTD., Tokyo (JP)

(72) Inventor: Hiroshige Nonaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/440,938

(22) Filed: Feb. 23, 2017

(65) Prior Publication Data

US 2018/0035005 A1 Feb. 1, 2018

(30) Foreign Application Priority Data

Jul. 29, 2016 (JP) .................. 2016-150191

(51) Int. Cl.
| | |
|---|---|
| H04N 1/333 | (2006.01) |
| H04L 29/08 | (2006.01) |
| H04L 29/12 | (2006.01) |
| H04N 1/00 | (2006.01) |
| H04N 1/32 | (2006.01) |

(52) U.S. Cl.
CPC ........... H04N 1/333 (2013.01); H04L 61/157 (2013.01); H04L 61/1594 (2013.01); H04L 67/06 (2013.01); H04L 67/30 (2013.01); *H04N 1/0022* (2013.01); *H04N 1/0097* (2013.01); *H04N 1/32069* (2013.01); *H04N 2201/0094* (2013.01); *H04N 2201/3205* (2013.01); *H04N 2201/3207* (2013.01)

(58) Field of Classification Search
USPC ....................................... 358/1.13
See application file for complete search history.

(56) References Cited

U.S. PATENT DOCUMENTS

| | | | | |
|---|---|---|---|---|
| 2007/0028187 A1* | 2/2007 | Katsuyama | ......... | G06F 3/04886 715/810 |
| 2013/0070295 A1* | 3/2013 | Maruyama | ............... | H04N 1/00 358/1.15 |
| 2013/0120791 A1 | 5/2013 | Fukushima | | |
| 2013/0182287 A1* | 7/2013 | Suzuki | ............... | H04N 1/00347 358/1.15 |

FOREIGN PATENT DOCUMENTS

| | | |
|---|---|---|
| JP | 5542757 B2 | 7/2014 |
| JP | 5847546 B2 | 1/2016 |

* cited by examiner

*Primary Examiner* — Ngon Nguyen
(74) *Attorney, Agent, or Firm* — Oliff PLC

(57) ABSTRACT

An information processing apparatus includes a presentation unit that, in response to receipt of an instruction to present a favorite destination of transmission, presents destination information designated as a favorite for the transmitting application of interest.

9 Claims, 12 Drawing Sheets

| CONTACT INFORMATION | DESTINATION | | | FAVORITE FLAG |
|---|---|---|---|---|
| | DESTINATION ID | TRANSMITTING APP | DESTINATION INFORMATION | |
| FUJI TARO | 001 | FAX | 0123456789 | ON |
| | 002 | E-mail | aaa@bb.com | OFF |
| | 003 | FTP | ftp://⋯⋯ | ON |
| | 004 | SMB | smb://⋯⋯ | OFF |
| | | | | |

FIG. 7

| TRANSMITTING APP | BASIC TRANSMITTING APP |
|---|---|
| MULTI-SEND | FAX |
| | E-mail |
| | FTP |
| | SMB |
| SIMPLE-FAX | FAX |
| USER-DEFINED APP A | E-mail |
| | FTP |
| .... | .... |

START
↓
RECEIVE CONTACT — S802
↓
PRESENT DESTINATION — S804
↓
RECEIVE DESIGNATION OF "FAVORITE" FOR EACH TRANSMITTING APP — S806
↓
STORE "FAVORITE" FLAG IN ASSOCIATION WITH DESTINATION FOR EACH TRANSMITTING APP — S808
↓
END

FIG. 9

| CONTACT INFORMATION 910 | DESTINATION 920 | | | FAVORITE FLAG 930 | MULTI-SEND FAVORITE FLAG 940 | SIMPLE-FAX FAVORITE FLAG 950 |
|---|---|---|---|---|---|---|
| | DESTINATION ID 922 | TRANSMITTING APP 924 | DESTINATION INFORMATION 926 | | | |
| FUJI TARO | 001 | FAX | 0123456789 | | | |
| | 002 | E-mail | aaa@bb.com | | | |
| | 003 | FTP | ftp://······ | | | |
| | 004 | SMB | smb://······ | | | |

| USER | FAVORITE DESTINATION ID |
|---|---|
|  |  |

| USER | FAVORITE DESTINATION INFORMATION |
|---|---|
|  |  |

1110 1120 1100

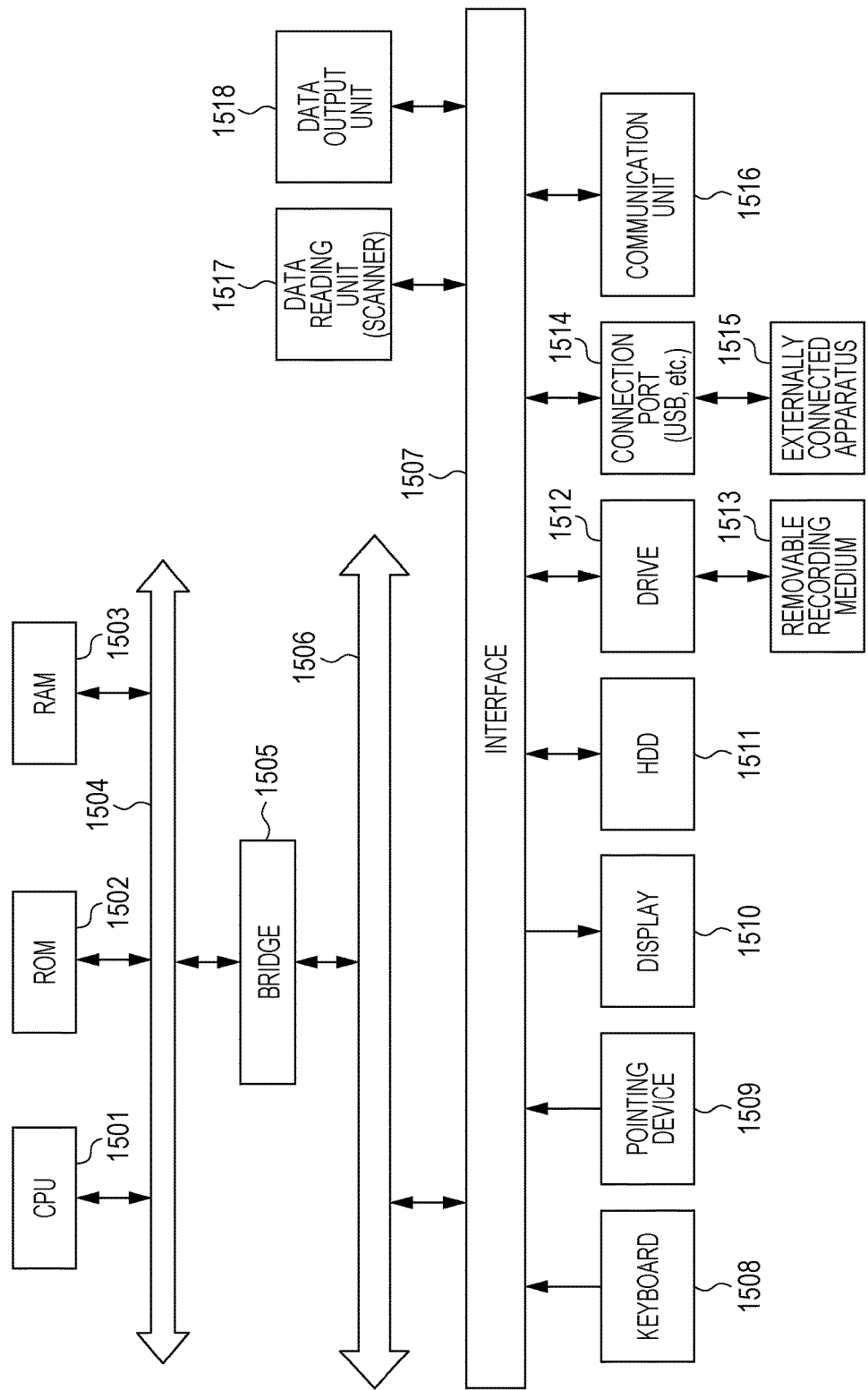

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2016-150191 filed Jul. 29, 2016.

BACKGROUND

Technical Field

The present invention relates to an information processing apparatus, a non-transitory computer readable medium, and an information processing method.

SUMMARY

According to an aspect of the invention, there is provided an information processing apparatus including a presentation unit that, in response to receipt of an instruction to present a favorite destination of transmission, presents destination information designated as a favorite for the transmitting application of interest.

BRIEF DESCRIPTION OF THE DRAWINGS

Exemplary embodiment of the present invention will be described in detail based on the following figures, wherein:

FIG. 7 illustrates an exemplary data structure of a transmitting app/basic transmitting app correspondence table;

FIG. 8 is a flowchart of an exemplary process according to the exemplary embodiment;

FIG. 9 illustrates an exemplary data structure of a contact table;

FIG. 10 illustrates an exemplary data structure of a user's favorites management table;

FIG. 11 illustrates an exemplary data structure of a user's favorites management table;

FIG. 15 is a block diagram illustrating an exemplary hardware configuration of a computer that implements the exemplary embodiment.

DETAILED DESCRIPTION

An exemplary embodiment of the present invention will be described below with reference to the drawings.

Figure 1:
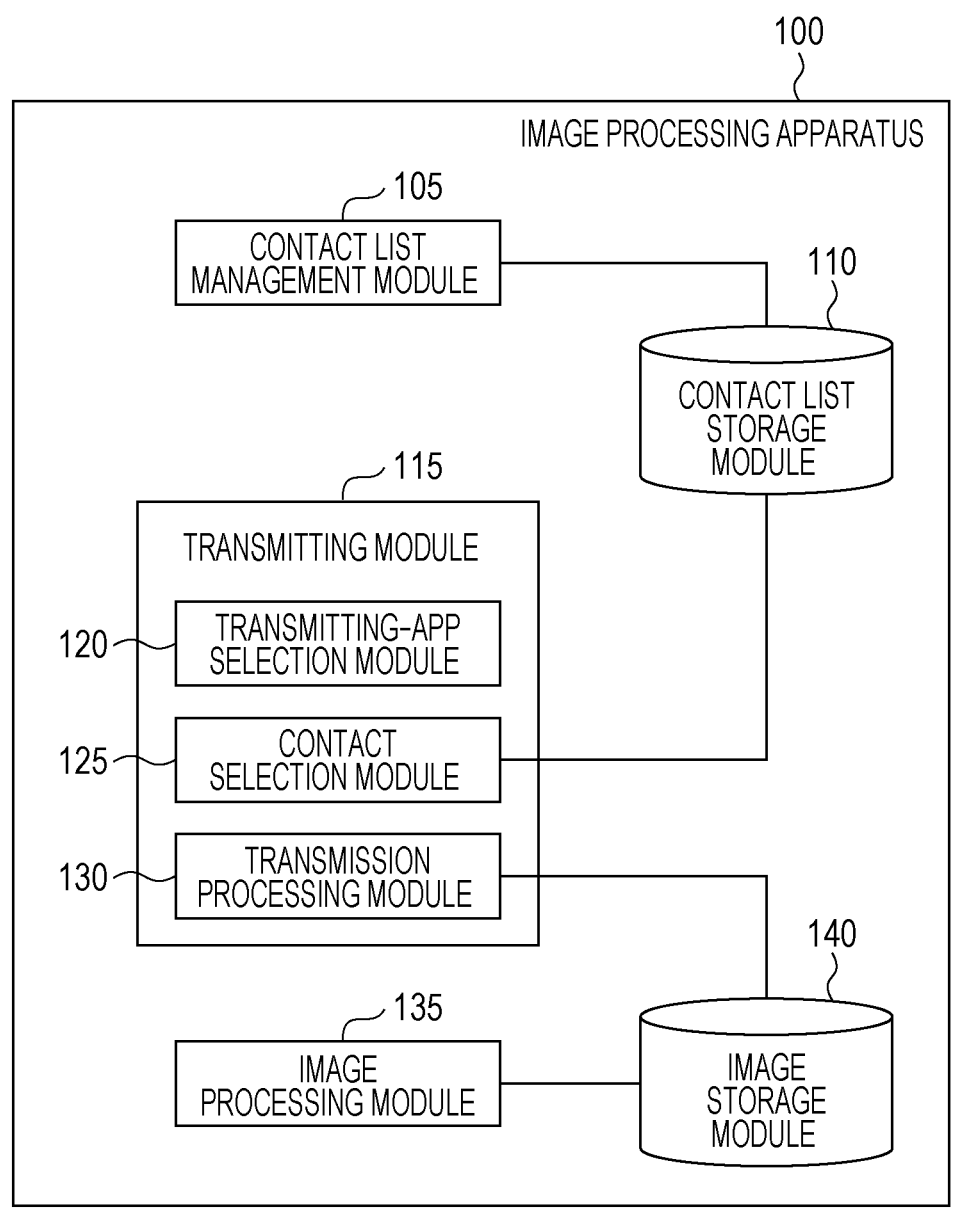
FIG. 1 is a conceptual module diagram of an exemplary configuration according to the exemplary embodiment.

FIG. 1 is a conceptual module diagram of an exemplary configuration according to the exemplary embodiment.

The term "module" generally refers to a logically separable component such as software (computer program) or hardware. Therefore, the term "module" as used in the exemplary embodiment refers to not only a module in a computer program but also a module in a hardware configuration. Thus, the exemplary embodiment will be also described in the context of a computer program for providing functions of such modules (a program for causing a computer to execute individual procedures, a program for causing a computer to function as individual units, and a program for causing a computer to implement individual functions), a system, and a method. Although "store", "be stored", and equivalent expressions are used herein for the convenience of description, these expressions mean, when an exemplary embodiment relates to a computer program, "cause a memory to store" or "control a memory so as to store". Although individual modules and functions may have a one-to-one correspondence, in actual implementation, a single module may be implemented by a single program, or multiple modules may be implemented by a single program. Conversely, a single module may be implemented by multiple programs. Further, multiple modules may be executed by a single computer, or a single module may be executed by multiple computers that are in a distributed or parallel environment. A single module may include another module. In the following description, the term "connection" refers to not only a physical connection but also a logical connection (such as exchanging of data, issuing of an instruction, and cross-reference between data items). The term "predetermined" as used herein means being determined prior to a process of interest, which not only means being determined before processing according to the exemplary embodiment begins but also being determined, even after the processing according to the exemplary embodiment begins, at any point in time preceding a process of interest in accordance with the condition/state at that point in time, or in accordance with the condition/state up to that point in time. If multiple "predetermined values" exist, each of these values may be different, or two or more of these values may be the same (which includes, of course, cases where all of these values are the same). Further, expressions that have the meaning of "if A, then B" is used to mean that "it is determined whether A, and then B if it is determined that A", unless it is not required to determine whether A.

Further, the term "system" or "apparatus" includes not only cases where a system or apparatus is made up of multiple components, such as computers, hardware components, or apparatuses that are connected to each other via a communication medium such as a network (including a one-to-one communication setup), but also cases where a system or apparatus is implemented by a single component such as a computer, a hardware component, or an apparatus. The terms "apparatus" and "system" are herein used synonymously. As a matter of course, the term "system" does not include what is merely a social "mechanism" (social system) which is a man-made arrangement of rules.

Further, for each process executed by each module or, if multiple processes are to be executed within a module, for each of the multiple processes, information of interest is read from a memory, and after execution of the corresponding process, the results of processing are written into the memory. Therefore, a description about reading of information from a memory prior to a process, or writing of information into a memory after a process will be sometimes omitted. The term "memory" as used herein may include a hard disk, a random access memory (RAM), an external storage medium, a memory using a communication line, and a register in a central processing unit (CPU).

An image processing apparatus 100 according to the exemplary embodiment has various transmitting applications (to be also referred to as "transmitting apps" hereinafter) for transmitting images. As illustrated in FIG. 1, the image processing apparatus 100 includes a contact list management module 105, a contact list storage module 110, a transmitting module 115, an image processing module 135, and an image storage module 140.

Although the exemplary embodiment will be directed to an example of the image processing apparatus 100 that transmits images, the image processing apparatus 100 may be any apparatus that transmits not only images but information (for example, text, audio, or moving-image information).

Examples of transmitting applications include facsimile transmission, e-mail, file transfer, Multi-send, and Simple-FAX. Thus, the image processing apparatus 100 supports multiple transmission protocols (communication protocols). Examples of such protocols include CCITT-G4 for facsimile transmissions, simple mail transfer protocol (SMTP) for e-mail transmissions, and file transfer protocol (FTP) and server message block (SMB) for file transfers. The transmitting applications and the transmission protocols used are not limited to those mentioned above. Examples of transmitting applications and transmission protocols may include user-defined transmitting applications and uploads to cloud services. Conversely speaking, the image processing apparatus 100 may be any image processing apparatus capable of using multiple transmitting applications and multiple transmission protocols, and may not need to be able to use all of the transmitting applications and transmission protocols mentioned above.

Information indicative of a destination of transmission (to be referred to as destination information hereinafter) is defined for each transmission protocol. Examples of such destination information include FAX numbers (telephone numbers) for facsimile transmissions, e-mail addresses for e-mail, and IP addresses for file transfers (FTP or SMB). Destination information represents information for identifying a destination. Contact information represents information for identifying a contact. Examples of contact information include personal names and organization names (for example, company names and group names). In a contact list (also commonly called an address book), contact information is associated with zero or more pieces of destination information. This is because there are usually multiple transmission methods (such as facsimile transmission, e-mail, or file transfer) for transmitting data to a contact.

Multi-send as a transmitting application has the function of allowing the same information to be transmitted to different destinations at once by a single operation. As destination information, for example, a combination of a FAX number, an e-mail address, and an IP address for FTP or SMB may be designated. Multiple pieces of destination information may represent transmission addressed to a single contact (for example, transferring an e-mail and a file to the same person), or different pieces of destination information may be set for each contact (for example, facsimile transmission for Person A and e-mail for Person B).

Simple-FAX is a transmitting application with which attributes (for example, the resolution of an image) necessary for transmission are set in advance (or may be set by default) to obviate the need to set such attributes.

The recent increases in the capacity of the contact list storage module 110 means that the contact list storage module 110 is able to retain large numbers of (for example, several tens of millions of) contacts. With such increases in the number of contacts, numerous attempts have been made to enable easy selection of a desired contact. Among these attempts is use of a function that registers a contact as a favorite. When a contact is registered as a favorite, the contact registered as a favorite is presented on the screen that first appears when the user uses a contact list. However, if a contact is registered as a favorite without using the image processing apparatus 100, situations can arise in which destination information not supported by the currently used transmitting application is presented. For example, when facsimile transmission is to be performed, an e-mail address registered as a favorite is also presented, resulting in presentation of unnecessary destination information.

Hereinafter, facsimile transmission, e-mail, file transfer (FTP), file transfer (SMB), Multi-send, and Simple-FAX will be described as examples of transmitting applications.

The contact list management module 105 is connected with the contact list storage module 110. The contact list management module 105 manages a contact list stored in the contact list storage module 110. For example, a pair of contact information and destination information is registered into the contact list. Specifically, in accordance with an operator's operation, contact information and destination information may be entered, or a contact list created in advance may be imported. The contact list management module 105 sets up, for each destination information, information (for example, a flag) indicating that the destination information is registered as "Favorite". Alternatively, the contact list management module 105 may set up, for each pair of a transmitting application and destination information, information indicating that the information pair is registered as "Favorite".

The contact list storage module 110 is connected with the contact list management module 105, and a contact selection module 125 of the transmitting module 115. The contact list storage module 110 stores a contact list for the image processing apparatus 100. Specifically, the contact list storage module 110 may store a single contact list for the image processing apparatus 100, rather than storing contact lists for individual users. That is, the operator of the image processing apparatus 100 uses the same contact list. The contact list may store information related to favorites. In this case, this information represents favorites for the image processing apparatus 100, and not favorites for individual users. Specific examples of contact lists include a contact table 400 illustrated in FIG. 4 described later, and a contact table 900 illustrated in FIG. 9 described later.

The contact list storage module 110 may store a management list for managing a favorite destination (destination information) for each user. In this case, a single contact list is used to manage favorites for individual users. Specific examples of such a management list include a user's favorites management table 1000 illustrated in FIG. 10 described later, and a management table 1100 illustrated in FIG. 11 described later.

The contact list storage module 110 may store a contact list for each user. Such a contact list may store information related to favorites. In this case, favorites are managed for individual users.

The transmitting module 115 includes a transmitting-app selection module 120, the contact selection module 125, and a transmission processing module 130. The transmitting module 115 performs processing related to transmission.

The transmitting-app selection module 120 selects a transmitting application in accordance with an operator's operation. For example, the transmitting-app selection module 120 selects one of the following transmitting applications: facsimile transmission, e-mail, file transfer (FTP), file transfer (SMB), Multi-send, and Simple-FAX.

The contact selection module 125 is connected with the contact list storage module 110. The contact selection module 125 receives destination information in accordance with an operator's operation. Destination information may be entered by the operator by using a device such as a keyboard or a touch panel. Alternatively, a contact list may be presented, and destination information may be selected from the presented contact list. There are two ways of presenting a contact list: presenting all of destination information within the contact list, and presenting favorite destination information.

When the contact selection module 125 receives an instruction to present a favorite destination, the contact selection module 125 presents destination information designated as a favorite for the transmitting application of interest. Such destination information designated as a favorite may sometimes contain destination information that is not supported for transmission by the transmitting application selected by the transmitting-app selection module 120. Accordingly, the contact selection module 125 presents only destination information supported for transmission by the transmitting application of interest. Then, destination information is selected in accordance with an operator's operation.

The expression "the transmitting application of interest" as used herein refers to the transmitting application that is being currently selected by the operator.

Destination information registered as "Favorite" refers to destination information that is presented to allow easy selection by the operator when an instruction to present a favorite destination is received. For example, destination information about a person expected to be frequently used as a destination (which may be subjectively decided by the operator (or by the person who instructs that registration be performed)) is registered as "Favorite".

The contact list management module 105 may allow one or more of multiple pieces of destination information corresponding to a contact to be selected and registered as favorites. Of course, the information to be registered as a favorite at this time is the destination information thus selected. This selection may be a selection made by an operator's operation, or may be a selection of a predetermined piece of destination information.

In this case, if multiple transmission protocols are supported by a transmitting application, the contact selection module 125 may present destination information registered as a favorite for the transmission protocol supported by the transmitting application of interest.

If multiple transmission protocols are supported by a single transmitting application, or if a single transmission protocol is supported by multiple transmitting applications, the contact list management module 105 may allow one or more pairs of destination information and a transmitting application corresponding to a contact to be selected and registered as favorites. At this time, there are multiple "pairs of destination information and a transmitting application". What is selected at this time is "a pair of destination information and a transmitting application". What is registered as a favorite at this time is the selected "pair of destination information and a transmitting application".

The image processing apparatus 100 may recognize an operator, and present "Favorite" destination information for the operator. For example, an operator may be recognized by reading information within an IC card carried by the operator, an operator may be recognized by a face recognition technique by using an image of the operator's face captured with a camera, or an operator may be recognized by reading the operator's biological information (for example, fingerprints).

The transmission processing module 130 is connected with the image storage module 140. The transmission processing module 130 transmits, by means of a transmitting application selected by the transmitting-app selection module 120, an image residing in the image storage module 140 to destination information selected by the contact selection module 125.

The image processing module 135 is connected with the image storage module 140. The image processing module 135 receives an image, and causes the image to be stored into the image storage module 140. The receiving of an image may be, for example, reading of an image with a scanner or other devices, receiving of an image from an external apparatus via a communication line by fax or other methods, or extracting of an image stored in a hard disk (including, other than a hard disk incorporated in a computer, a hard disk connected via a network). The image to be received may be a binary image or a multi-valued image (including a color image). The number of images to be recorded may be one, or two or more. The image is not limited to any particular type, and may be, for example, a document used for business purposes, or a brochure used for advertisement purposes.

The image storage module 140 is connected with the transmission processing module 130 of the transmitting module 115, and the image processing module 135. The image storage module 140 stores images to be transmitted.

Figure 2:
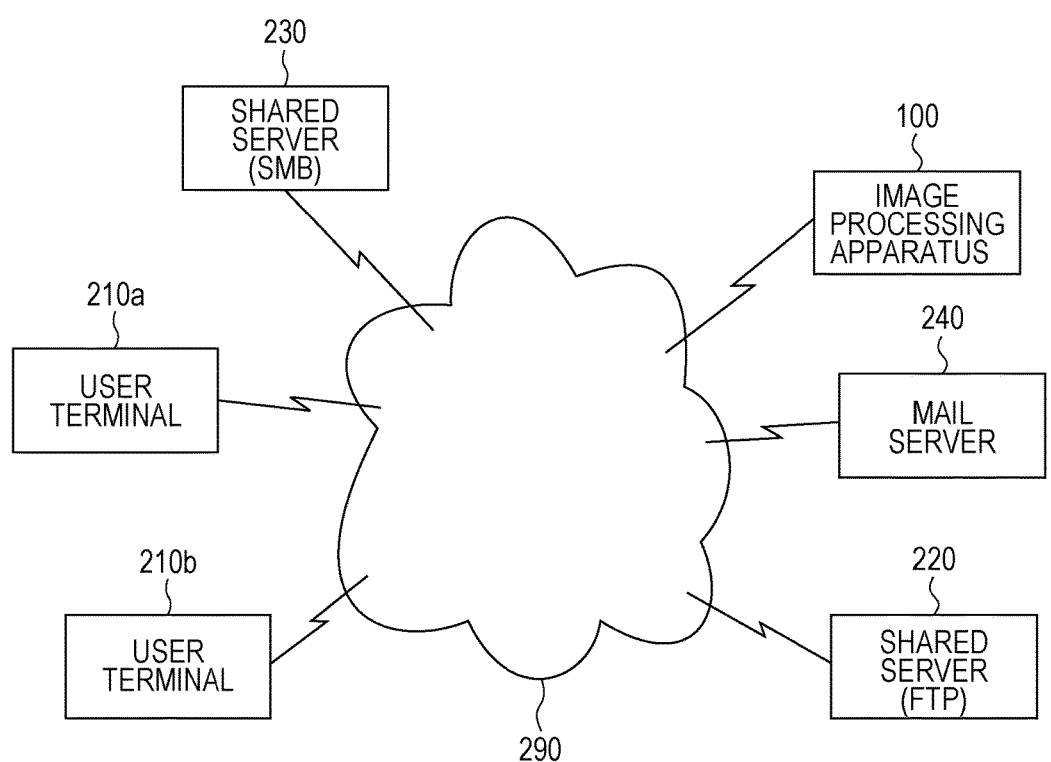
FIG. 2 illustrates an exemplary system configuration according to the exemplary embodiment.

FIG. 2 illustrates an exemplary system configuration according to the exemplary embodiment.

The image processing apparatus 100, a user terminal 210*a*, a user terminal 210*b*, a shared server (FTP) 220, a shared server (SMB) 230, and a mail server 240 are connected to each other via a communication line 290. The communication line 290 may be a wireless communication line, a wired communication line, or a combination thereof. For example, the communication line 290 may be the Internet or an intranet as a communication infrastructure.

For example, as part of routine work, the operator scans a document with the image processing apparatus 100, and transmits the resulting image via e-mail to the operator himself or herself (the user terminal 210*a* and the mail server 240) and User B (the user terminal 210*b* and the mail server 240), who is the operator's supervisor. Further, the operator also stores the image into the shared server (FTP) 220 in which a folder shared by Group A to which the operator belongs resides, and the shared server (SMB) 230 in which a folder shared by Group B related to work resides. In this case, multiple transmission protocols are used. Accordingly, using a transmitting application that supports Multi-send is more convenient than using individual transmitting applications (e-mail, file transfer (FTP), and file transfer (SMB)) for the transmission. In that case, if the operator's e-mail address, the e-mail address of User B, the IP address of the shared server (FTP) 220, and the IP address of the shared server (SMB) 230 have been registered as favorites, presenting such favorite destination information when the operator is to select a destination makes it easier to find a destination than presenting all of information within a contact list when the operator is to select a destination.

Figures 3, 4:
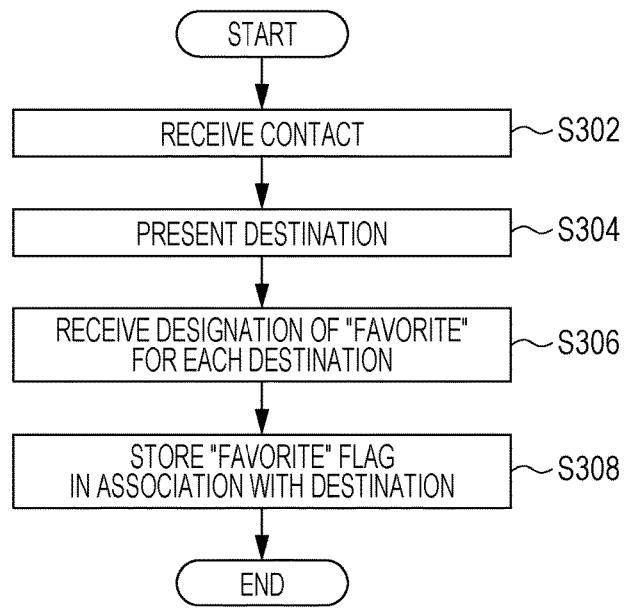
FIG. 3 is a flowchart of an exemplary process according to the exemplary embodiment.
FIG. 4 illustrates an exemplary data structure of a contact table.

FIG. 3 is a flowchart of an exemplary process according to the exemplary embodiment. This process represents an exemplary process for "Favorites" registration. It is assumed that contact information, destination information, and other information have been registered in advance.

At step S302, a contact is received in accordance with an operator's operation.

At step S304, destination information for the contact is presented.

At step S306, designation of "Favorite" for each destination is received in accordance with an operator's operation.

At step S308, a "Favorite" flag is stored in association with each destination.

The above process generates, for example, the contact table 400. FIG. 4 illustrates an exemplary data structure of the contact table 400. The contact table 400 has a contact information field 410, a destination field 420, and a Favorite flag field 430. The destination field 420 has a destination ID field 422, a transmitting app field 424, and a destination information field 426. That is, zero or more (typically, multiple) pieces of destination information are associated with contact information. In the contact table 400, destination information and a Favorite flag have a one-to-one correspondence.

The contact information field 410 stores contact information. The destination field 420 stores a destination. The destination ID field 422 stores information for uniquely identifying a destination (destination identification (ID)) according to the exemplary embodiment. The transmitting app field 424 stores a transmitting app. The destination information field 426 stores destination information. The Favorite flag field 430 stores a Favorite flag. The "ON" state of this Favorite flag indicates that the corresponding destination information has been registered as "Favorite". The "OFF" state of the Favorite flag indicates that the corresponding destination information has not been registered as "Favorite" (the corresponding destination information is general destination information).

Figure 5:
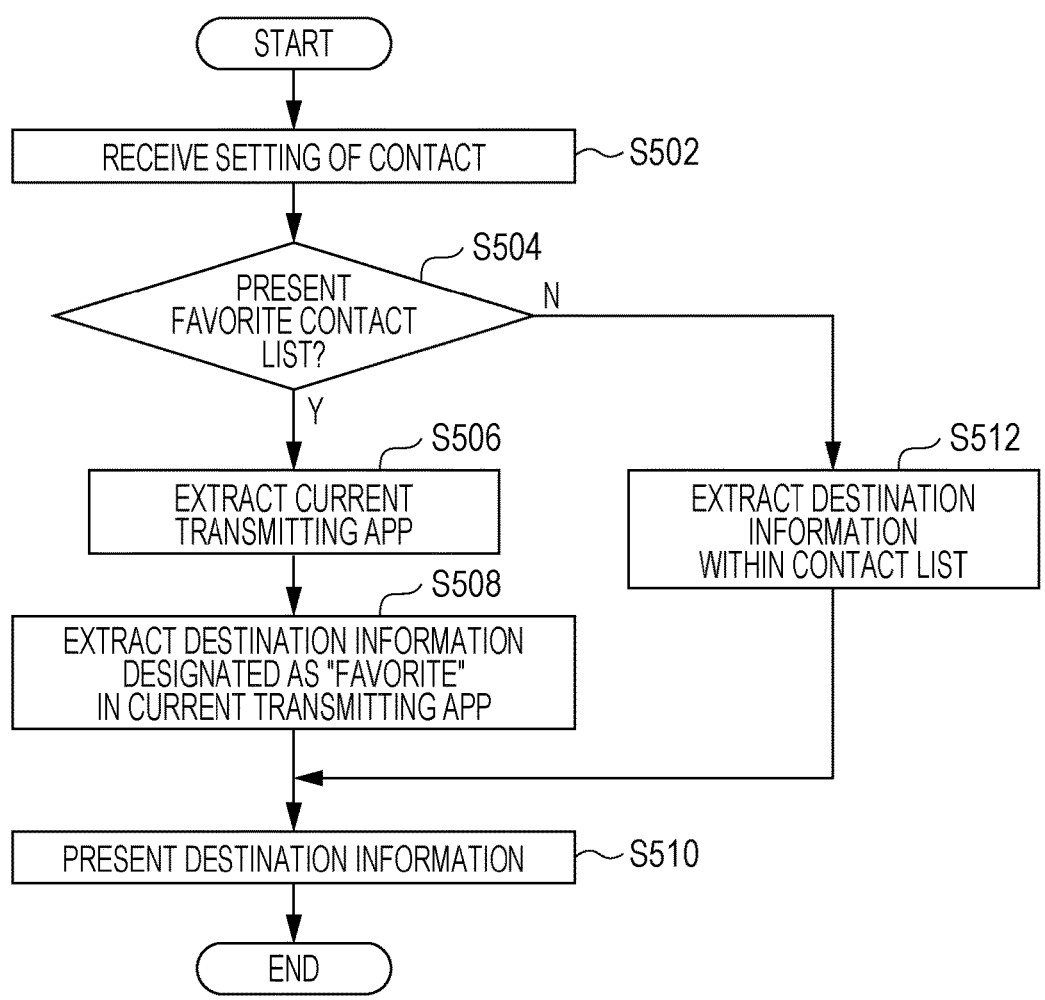
FIG. 5 is a flowchart of an exemplary process according to the exemplary embodiment.

FIG. 5 is a flowchart of an exemplary process according to the exemplary embodiment. The exemplary process represents presentation of destination information. In particular, the exemplary process concerns a case in which the transmitting apps used are all basic transmitting apps. A basic transmitting app refers to a transmitting app for transmitting data in accordance with only a transmission protocol. Accordingly, a basic transmitting app has a one-to-one correspondence with a transmission protocol. In the above-mentioned example, facsimile transmission, e-mail, file transfer (FTP), and file transfer (SMB) each correspond to the basic transmission app.

At step S502, setting of a contact is received in accordance with an operator's operation.

At step S504, in accordance with an operator's operation, it is determined whether to present a favorite contact list. The process proceeds to step S506 if a favorite contact list is to be presented. Otherwise, the process proceeds to step S512.

At step S506, the current transmitting app is extracted. That is, which transmitting app has been launched may be detected.

At step S508, destination information designated as "Favorite" in the transmitting app is extracted.

At step S512, destination information within the contact list is extracted. Then, the process proceeds to step S510.

At step S510, destination information is presented. Of course, not only destination information but also information such as contact information may be presented at this time. Then, the operator selects the presented destination information.

Figure 6:
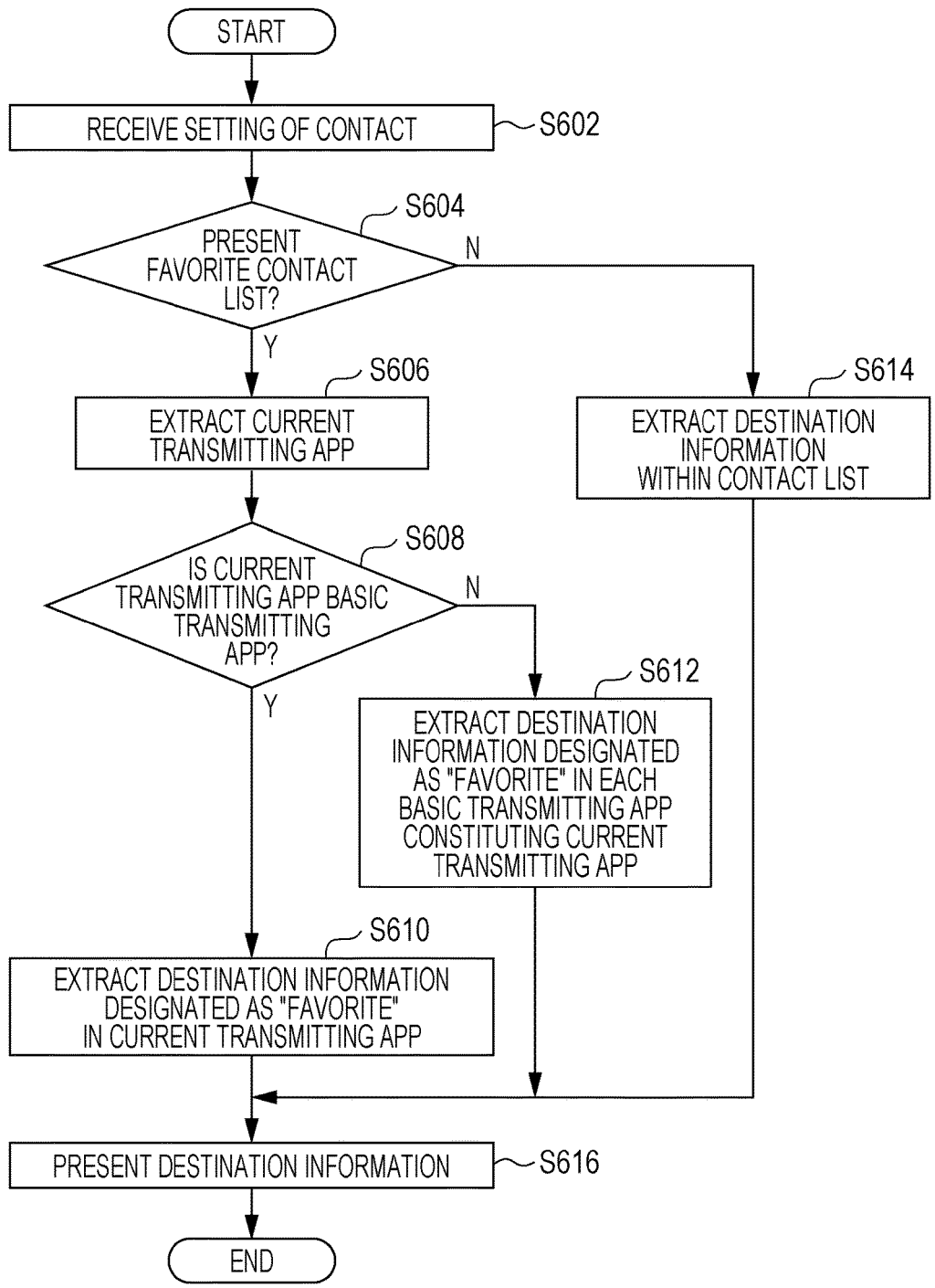
FIG. 6 is a flowchart of an exemplary process according to the exemplary embodiment.

FIG. 6 is a flowchart of an exemplary process according to the exemplary embodiment. The exemplary process represents presentation of destination information. In particular, the exemplary process concerns a case in which not all the transmitting apps used are basic transmitting apps. In the above-mentioned example, Multi-send, and Simple-FAX correspond to transmitting apps that are not basic transmitting apps.

At step S602, setting of a contact is received in accordance with an operator's operation.

At step S604, in accordance with an operator's operation, it is determined whether to present a favorite contact list. The process proceeds to step S606 if a favorite contact list is to be presented. Otherwise, the process proceeds to step S614.

At step S606, the current transmitting app is extracted. That is, which transmitting app has been launched may be detected.

At step S608, it is determined whether the transmitting app is a basic transmitting app. The process proceeds to step S610 if the transmitting app is a basic transmitting app. Otherwise, the process proceeds to step S612. This determination may be made by, for example, using a transmitting app/basic transmitting app correspondence table 700. FIG. 7 illustrates an exemplary data structure of the transmitting app/basic transmitting application correspondence table 700. The transmitting app/basic transmitting app correspondence table 700 has a transmitting app field 710, and a basic transmitting app field 720. The transmitting app field 710 stores a transmitting app. The basic transmitting app field 720 stores a basic transmitting app. For example, Multi-send as a transmitting application includes, as basic transmitting apps, facsimile transmission, e-mail, file transfer (FTP), and file transfer (SMB). Simple-FAX as a transmitting application includes facsimile transmission as a basic transmitting app. User-defined App A as a transmitting application includes, as basic transmitting apps, e-mail and file transfer (FTP).

At step S610, destination information designated as "Favorite" in the currently used transmitting app is extracted.

At step S612, destination information designated as "Favorite" in each basic transmitting app constituting the transmitting app is extracted. Then, the process proceeds to step S616.

At step S614, destination information within the contact list is extracted. Then, the process proceeds to step S616.

At step S616, destination information is presented. Of course, not only destination information but also information such as contact information may be presented at this time. Then, the operator selects the presented destination information.

FIG. 8 is a flowchart of an exemplary process according to the exemplary embodiment. This process represents an exemplary process for "Favorites" registration. It is assumed that contact information, destination information, and other information have been registered in advance.

At step S802, setting of a contact is received in accordance with an operator's operation.

At step S804, destination information for the contact is presented.

At step S806, designation of "Favorite" for each destination is received in accordance with an operator's operation.

At step S808, a "Favorite" flag is stored in association with a destination for each transmitting app.

The above process generates, for example, the contact table 900. FIG. 9 illustrates an exemplary data structure of the contact table 900. In the contact table 900 illustrated in FIG. 9, a Multi-send Favorite flag field 940 and a Simple-FAX Favorite flag field 950 are added to the contact table 400 illustrated in FIG. 4. The contact table 900 has a contact information field 910, a destination field 920, a Favorite flag field 930, the Multi-send Favorite flag field 940, and the Simple-FAX Favorite flag field 950. The destination field 920 has a destination ID field 922, a transmitting app field 924, and a destination information field 926. The Multi-send Favorite flag field 940 stores a Favorite flag for Multi-send. The Simple-FAX Favorite flag field 950 stores a Favorite flag for Simple-FAX. That is, favorites for transmitting apps that are not basic transmitting apps are registered in the Multi-send Favorite flag field 940 and the Simple-FAX Favorite flag field 950. The "ON" state of the Favorite flag in each of the Multi-send Favorite flag field 940 and the Simple-FAX Favorite flag field 950 indicates that the destination information for the corresponding transmitting application has been registered as "Favorite". The "OFF" state of the Favorite flag indicates that the destination information for the corresponding transmitting application has not been registered as "Favorite" (the destination information is general destination information).

Use of the contact table 900 allows processing to be performed in accordance with the flowchart illustrated in FIG. 5 even when not all transmitting apps are basic transmitting apps.

When the user's favorites management table 1000 or the user's favorites management table 1100 is used, this allows favorites to be presented for individual users even when processing is performed in accordance with the flowchart illustrated in each of FIGS. 5 and 6.

FIG. 10 illustrates an exemplary data structure of the user's favorites management table 1000. The user's favorites management table 1000 has a user field 1010, and a favorite destination ID field 1020. The user field 1010 stores a user (such as a user ID). The favorite destination ID field 1020 stores a user's favorite destination ID (corresponding to the destination ID field 422 of the contact table 400 and the destination ID field 922 of the contact table 900).

FIG. 11 illustrates an exemplary data structure of the user's favorites management table 1100. The user's favorites management table 1100 has a user field 1110, and a favorite destination information field 1120. The user field 1110 stores a user (such as a user ID). The favorite destination information field 1120 stores favorite destination information for the user.

That is, the user's favorites management table 1000 stores a link to destination information, whereas the user's favorites management table 1100 stores the destination information itself.

That is, from the user ID of the operator who is currently logging in the image processing apparatus 100, "Favorite" destination information corresponding to the user ID may be extracted by using the user's favorites management table 1000 or the user's favorites management table 1100.

Figure 12:
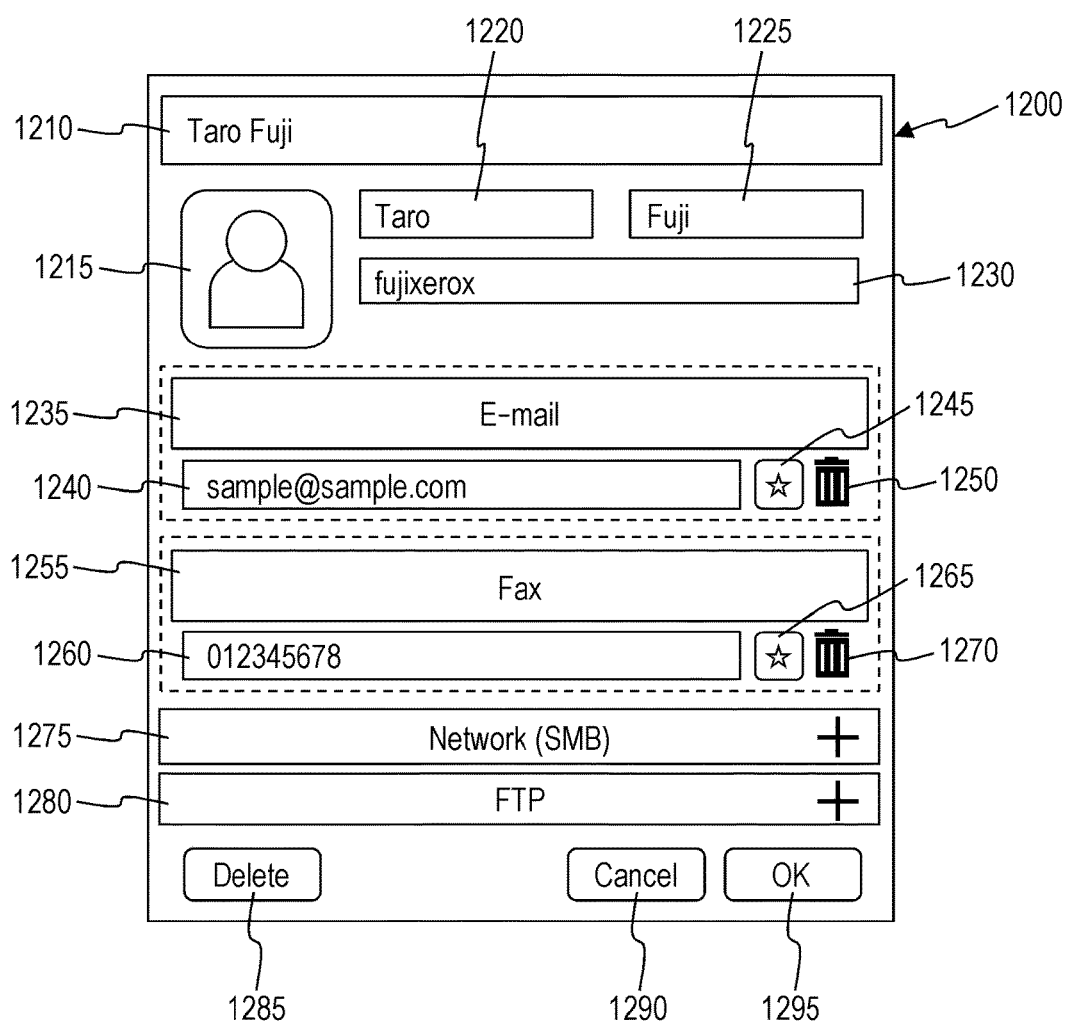
FIG. 12 illustrates an exemplary process according to the exemplary embodiment.

FIG. 12 illustrates an exemplary process according to the exemplary embodiment. At the time of registration of information such as contact information and destination information, a contact setting screen 1200 is presented, and "Favorites" are set by an operator's operation. The contact setting screen 1200 is used to generate the contact table 400.

The contact setting screen 1200 displays a contact field 1210, a contact's photograph display area 1215, a first-name field 1220, a last-name field 1225, the affiliation field 1230, an E-mail field 1235, a FAX field 1255, an SMB field 1275, an FTP field 1280, a delete button 1285, a cancel button 1290, and an OK button 1295. In this example, with "Fuji Taro" as a contact, an e-mail address and a FAX number are registered as destination information. Of course, selecting "+" in the SMB field 1275 and "+" in the FTP field 1280 enables registration of IP addresses and "Favorites" for file transfer (SMB) and for file transfer (FTP), respectively.

The E-mail field 1235 shows an address field 1240, a Favorite designation button 1245, and a delete button 1250. When the Favorite designation button 1245 is selected by an operator's operation, an e-mail address entered in the address field 1240 is registered as "Favorite".

The FAX field 1255 shows a FAX number field 1260, a Favorite designation button 1265, and a delete button 1270. When the Favorite designation button 1265 is selected by an operator's operation, a FAX number entered in the FAX number field 1260 is registered as "Favorite".

Selecting the delete button 1285 deletes information such as contact information within the contact setting screen 1200. Selecting the cancel button 1290 cancels entries made after display of the contact setting screen 1200. Selecting the OK button 1295 stores information such as contact information within the contact setting screen 1200 into the contact table 400.

Figure 13:
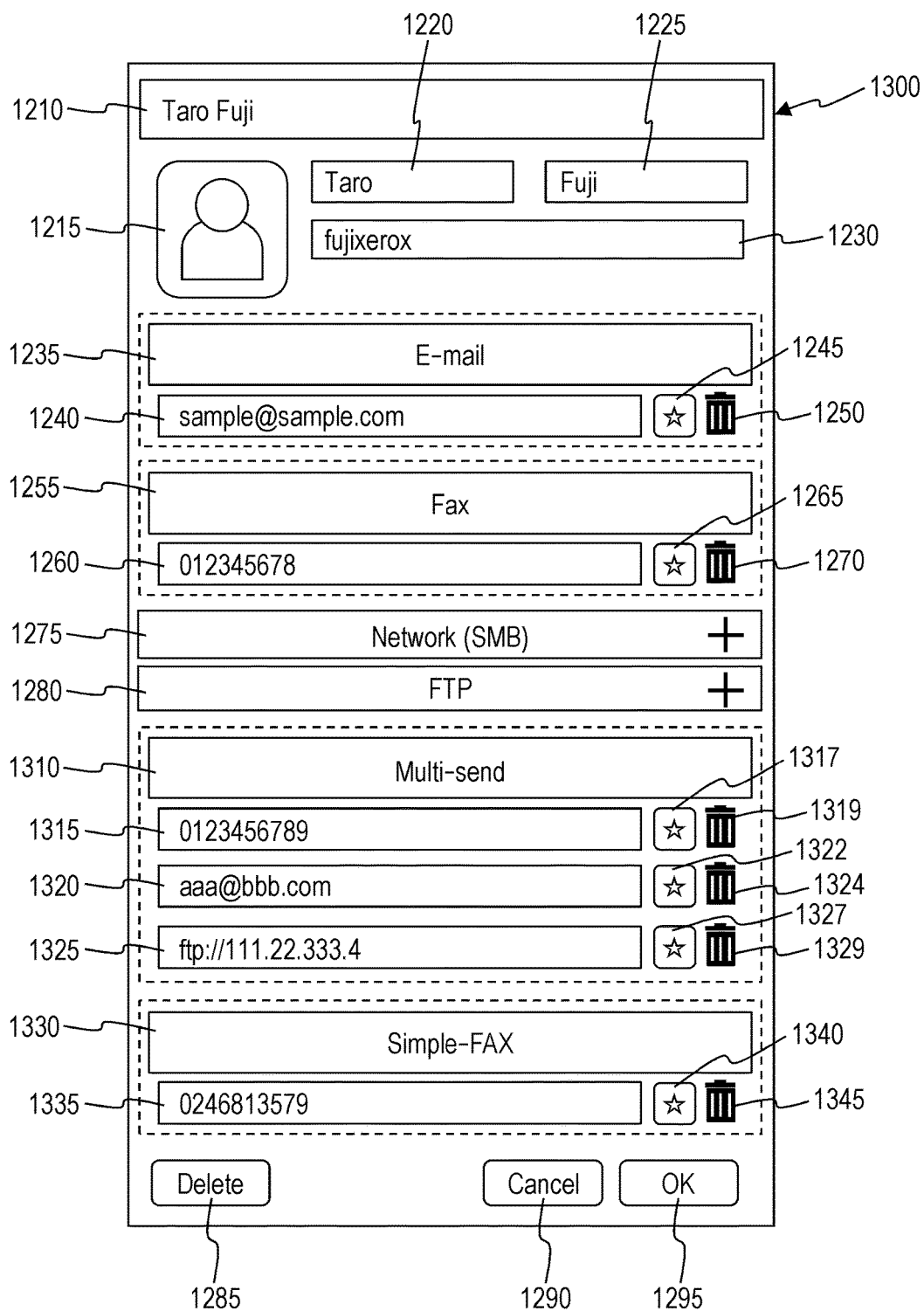
FIG. 13 illustrates an exemplary process according to the exemplary embodiment.

FIG. 13 illustrates an exemplary process according to the exemplary embodiment. At the time of registration of information such as contact information and destination information, a contact setting screen 1300 is presented, and "Favorites" are set by an operator's operation. The contact setting screen 1300 is used to generate the contact table 900.

The contact setting screen 1300 includes a Multi-send field 1310 and a Simple-FAX field 1330 that are added to the contact setting screen 1200 illustrated in FIG. 12.

The contact setting screen 1300 displays the contact field 1210, the contact's photograph display area 1215, the first-name field 1220, the last-name field 1225, an affiliation field 1230, the E-mail field 1235, the FAX field 1255, the SMB field 1275, the FTP field 1280, the Multi-send field 1310, the Simple-FAX field 1330, the delete button 1285, the cancel button 1290, and the OK button 1295. In this example, with "Fuji Taro" as a contact, information such as an e-mail address, a FAX number, a FAX number for Multi-send, and a FAX number for Simple-FAX are registered as destination information.

The Multi-send field 1310 shows a FAX number field 1315, a Favorite designation button 1317, a delete button 1319, an address field 1320, a Favorite designation button 1322, a delete button 1324, a FTP field 1325, a Favorite designation button 1327, and a delete button 1329. When the Favorite designation button 1317 is selected by an operator's operation, a FAX number entered in the FAX number field 1315 is registered as "Favorite" for Multi-send. Likewise, when the Favorite designation button 1322 is selected, an e-mail address entered in the address field 1320 is registered as "Favorite" for Multi-send. When the Favorite designation button 1327 is selected, an IP address for FTP entered in the FTP field 1325 is registered as "Favorite" for Multi-send.

The Simple-FAX field 1330 shows a FAX number field 1335, a Favorite designation button 1340, and a delete button 1345. When the Favorite designation button 1340 is selected by an operator's operation, a FAX number entered in the FAX number field 1335 is registered as "Favorite" for Simple-FAX.

Selecting the OK button 1295 stores information such as contact information within the contact setting screen 1300 into the contact table 900.

Figure 14A:
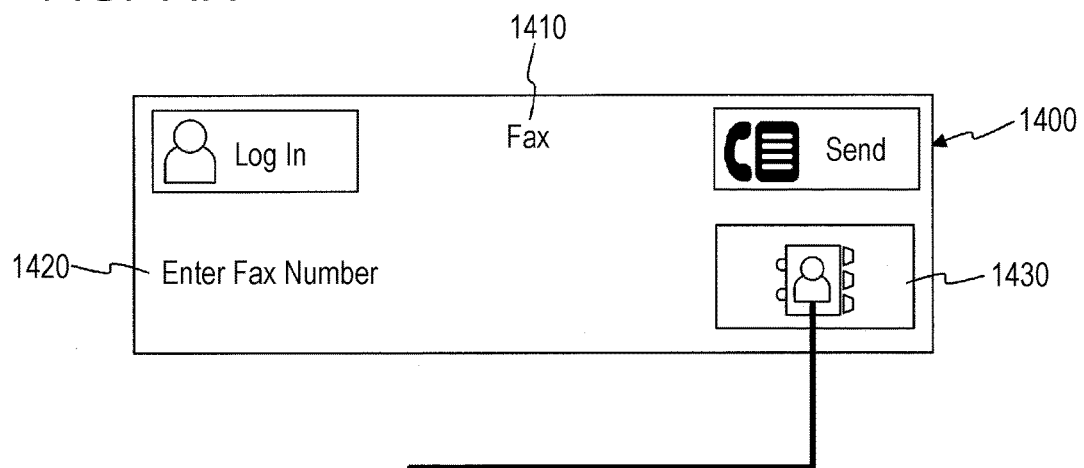
FIGS. 14A and 14B illustrate an exemplary process according to the exemplary embodiment.
Figure 14B:
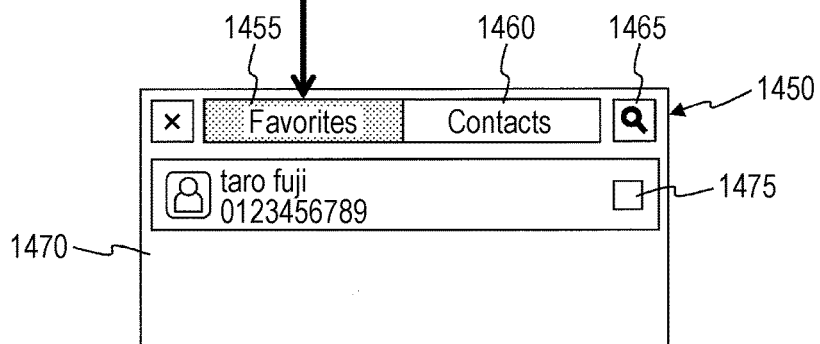

FIGS. 14A and 14B illustrate an exemplary process according to the exemplary embodiment.

A destination designation screen 1400 illustrated in FIG. 14A represents an example of information presented upon launching of the transmitting app for facsimile transmission.

The destination designation screen 1400 displays a transmitting app display field (FAX) 1410, a destination designation field 1420, and a contact list button 1430. A FAX number is entered into the destination designation field 1420. Alternatively, the contact list button 1430 may be selected so that a contact list is presented to present a list of destination information, enabling selection of a FAX number from the presented list.

A contact list display screen 1450 illustrated in FIG. 14B is presented when the contact list button 1430 is selected.

The contact list display screen 1450 displays a "Favorite" tag 1455, a contact list tag 1460, a search button 1465, a contact display area 1470, and a checkbox 1475.

When the contact list button 1430 is selected, the contact list display screen 1450 is presented with the "Favorite" tag 1455 in the selected state. That is, information such as a FAX number designated as "Favorite" is presented in the contact display area 1470. When the checkbox 1475 is selected, the FAX number is entered into the destination designation field 1420. If "Favorites" are managed for each user, a "Favorite" FAX number or other information designated as "Favorite" for the user is presented in the contact display area 1470.

When the contact list tag 1460 is selected, all FAX numbers or other information items stored in the contact list storage module 110 are presented in the contact display area 1470. Of course, a larger number of FAX numbers or other information items are presented at this time than when the "Favorite" tag 1455 is selected. When the search button 1465 is selected, a field for entering a search is displayed, enabling a search of the contact table 400 or the contact table 900 within the contact list storage module 110.

An exemplary hardware configuration of the information processing apparatus according to the exemplary embodiment will be described below with reference to FIG. 15. The configuration illustrated in FIG. 15 is implemented by, for example, a personal computer (PC), and represents an exemplary hardware configuration including a data reading unit 1517, such as a scanner, and a data output unit 1518, such as a printer.

A central processing unit (CPU) 1501 is a controller that executes processes according to a computer program describing an execution sequence of various modules described above with reference to the exemplary embodiment, that is, modules such as the contact list management module 105, the transmitting module 115, the transmitting-app selection module 120, the contact selection module 125, the transmission processing module 130, and the image processing module 135.

A read only memory (ROM) 1502 stores programs, operation parameters, and other information used by the CPU 1501. A random access memory (RAM) 1503 stores programs used for execution by the CPU 1501, parameters that change during the execution, and other information. The CPU 1501, the ROM 1502, and the RAM 1503 are connected to one another via a host bus 1504, such as a CPU bus.

The host bus 1504 is connected to an external bus 1506, such as a peripheral component interconnect/interface (PCI) bus, via a bridge 1505.

A keyboard 1508, and a pointing device 1509 such as a mouse are input devices operated by the operator. A display 1510 may be a liquid crystal display device or a cathode ray tube (CRT), and displays various information as text or image information. The display 1510 may be a touch screen or other devices including both the functions of the pointing device 1509 and the display 1510.

A hard disk drive (HDD) 1511 includes a hard disk (which may be a flash memory or other devices) built in the HDD 1511. The HDD 1511 drives the hard disk so as to record or reproduce a program or information executed by the CPU 1501. The hard disk is caused to implement the functions of modules such as the contact list storage module 110 and the image storage module 140. Further, various data, various computer programs, and other information are stored in the HDD 1511.

A drive 1512 reads out data or a program recorded on a removable recording medium 1513 loaded therein, such as a magnetic disk, an optical disc, a magneto-optical disc, or a semiconductor memory. The drive 1512 then supplies the data or program to the RAM 1503 connected to the drive 1512 via an interface 1507, the external bus 1506, the bridge 1505, and the host bus 1504. The removable recording medium 1513 may also serve as a data recording area.

A connection port 1514 is a port for connecting an externally connected apparatus 1515, and includes a connection unit such as a universal serial bus (USB) or IEEE1394. The connection port 1514 is connected to the CPU 1501 and other units via the interface 1507, the external bus 1506, the bridge 1505, the host bus 1504, and other components. A communication unit 1516 is connected to a communication line, and executes communication of data with an external apparatus. The data reading unit 1517 is, for example, a scanner, and executes reading of a document. The data output unit 1518 is, for example, a printer, and executes output of document data.

The hardware configuration of the information processing apparatus depicted in FIG. 15 is only illustrative. The exemplary embodiment is not limited to the configuration illustrated in FIG. 15 but may employ any configuration that enables execution of the modules described above with reference to the exemplary embodiment. For example, some modules may be implemented by dedicated hardware (such as an application-specific integrated circuit (ASIC)), and some modules may be located within an external system and connected via a communication line. Further, multiple systems illustrated in FIG. 15 may be connected to each another by a communication line so as to operate in cooperation with each other. The above-mentioned configuration may be incorporated in, other than personal computers, in particular, portable information communication devices (including cellular phones, smart phones, mobile devices, wearable computers, and other devices), information home appliances, robots, copiers, facsimiles, scanners, printers, and multifunction machines (image processing apparatuses having two or more of scanner, printer, copier, facsimile, and other functions), for example.

The expressions such as "to present" or "presentation" as used with reference to the above-mentioned exemplary embodiment may refer to, other than display of information on a display device such as a display, an action such as printing on a printing device, such as a printer, output of sound to an audio output device, such as a speaker, or a combination thereof.

The program described herein may be provided in the form of being stored on a recording medium, or the program may be provided via a communication unit. In that case, for example, the above-mentioned program may be understood as an exemplary embodiment of the invention related to a "computer readable recording medium recording a program".

A "computer readable recording medium recording a program" refers to a computer readable recording medium on which a program is recorded and which is used for purposes such as installing, executing, and distributing the program.

Examples of the recording medium include digital versatile discs (DVDs), such as "DVD-R, DVD-RW, DVD-RAM, or other types of DVDs", which are standards developed by the DVD Forum, and "DVD+R, DVD+RW, or other types of DVDs", which are standards developed by the DVD+RW alliance, compact discs (CDs) such as read-only memory (CD-ROM), CD-Recordable (CD-R), and CD-Rewritable (CD-RW) discs, Blu-ray (registered trademark) discs, magneto-optical discs (MOs), flexible disks (FDs), magnetic tapes, hard disks, read-only memories (ROMs), Electrically Erasable Programmable Read-only Memories (EEPROMs (registered trademark)), flash memories, random access memories (RAMs), and secure digital (SD) memory cards.

The entirety or a portion of the above-mentioned program may be recorded on the above-mentioned recording medium for purposes such as saving and distribution. Alternatively, the program may be transmitted by communication, for example, via a transmission medium such as a wired network or a wireless communication network which is used for a local area network (LAN), a metropolitan area network (MAN), a wide area network (WAN), the Internet, an intranet, an extranet, or other networks, or a combination thereof, or may be carried on a carrier wave.

Further, the program mentioned above may constitute a portion or the entirety of another program, or may be recorded on a recording medium together with a different program. Alternatively, the program may be recorded separately on multiple recording media. Furthermore, the program may be recorded in any form, such as compressed or encrypted, as long as the program may be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a display;
   a presentation unit, implemented by a central processing unit, that:
      extracts which transmitting application is currently launched;
      in response to receipt of an instruction to present a favorite contact list:
         extracts destination information designated as a favorite based on the extracted transmitting application; and
         presents, on the display, the destination information; and
      in response to receipt of an instruction to not present the favorite contact list, extracts destination information within a contact list, wherein
   when the presentation unit extracts that a multi-send application is currently launched, the presentation unit presents the favorite contact list and extracts destination information for multiple transmitting applications, and
   upon receipt of an instruction to send a communication, the information processing unit sends the communication via multiple transmitting applications simultaneously.

2. The information processing apparatus according to claim 1, further comprising
   a registration unit that registers, as favorites, one or more pieces of destination information selected from a plurality of pieces of destination information corresponding to a contact.

3. The information processing apparatus according to claim 2,
   wherein if a plurality of transmission protocols are supported by a transmitting application, the presentation unit presents destination information designated as a favorite for a transmission protocol corresponding to a transmitting application of interest.

4. The information processing apparatus according to claim 1,
   wherein a plurality of transmission protocols are supported by a single transmitting application, or a single transmission protocol is supported by a plurality of transmitting applications, and
   wherein the information processing apparatus further comprises a registration unit that registers, as favorites, one or more pairs of destination information and a transmitting application selected from a plurality of pairs of destination information and a transmitting application corresponding to a contact.

5. The information processing apparatus according to claim 1, further comprising:
   a receiving unit that receives an image; and
   a transmitting unit that transmits the image,
   wherein the information processing apparatus has a contact list, and
   wherein a favorite destination is managed for each user.

6. The information processing apparatus according to claim 1, wherein the presentation unit, in response to receipt of an instruction to present a contact display screen, presents, on the display:
   (1) a favorites tag that, when selected, presents destination information designated as a favorite based on a transmitting application of interest, wherein different favorites are associated with different transmitting applications, and
   (2) a contacts tag that, when selected, presents a list of contacts,
   wherein when the contact list button is selected, the favorites tab is in a selected state.

7. The information processing apparatus according to claim 1, wherein the presentation unit:
   registers, as favorites, one or more pieces of destination information corresponding to a contact and associates each favorite with each respective transmission application of a plurality of transmission applications;

receives a selection, from a user via a graphical user interface, of a transmission application among the plurality of transmission applications;

determines a plurality of transmission protocols are supported by the selected transmitting application; and in response to receipt of an instruction to present a favorite destination of transmission, presents destination information registered as a favorite for a transmission protocol corresponding to the selected transmitting application.

8. A non-transitory computer readable medium storing a program causing a computer to execute a process for processing information, the process comprising:

extracting which transmitting application is currently launched;

in response to receipt of an instruction to present a favorite contact list:

extracting destination information designated as a favorite based on the extracted transmitting application; and presenting, on a display of an information processing apparatus, the destination information;

in response to receipt of an instruction to not present the favorite contact list:

extracting destination information within a contact list; and when extracting which transmitting application is currently launched extracts that a multi-send application is currently launched:

presenting the favorite contact list and extracting destination information for multiple transmitting applications; and upon receipt of an instruction to send a communication, sending the communication via multiple transmitting applications simultaneously.

9. An information processing method comprising:

extracting which transmitting application is currently launched on an information processing apparatus;

in response to receipt of an instruction to present a favorite contact list:

presenting, on a display of the information processing apparatus, the destination information;

in response to receipt of an instruction to not present the favorite contact list:

extracting destination information within a contact list; and when extracting which transmitting application is currently launched extracts that a multi-send application is currently launched:

presenting the favorite contact list and extracting destination information for multiple transmitting applications; and upon receipt of an instruction to send a communication, sending the communication via multiple transmitting applications simultaneously.

* * * * *